US008957985B2

(12) United States Patent
Tsuda (10) Patent No.: US 8,957,985 B2
(45) Date of Patent: Feb. 17, 2015

(54) IMAGING APPARATUS AND CONTROL METHOD FOR IMAGING APPARATUS INCLUDING IMAGE PROCESSING USING EITHER A REDUCED IMAGE OR A DIVIDED IMAGE

(75) Inventor: Yuji Tsuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 189 days.

(21) Appl. No.: 13/538,709

(22) Filed: Jun. 29, 2012

(65) Prior Publication Data

US 2013/0010156 A1   Jan. 10, 2013

(30) Foreign Application Priority Data

Jul. 5, 2011 (JP) .................................. 2011-149084

(51) Int. Cl.
*H04N 9/73* (2006.01)
*H04N 5/235* (2006.01)
*G06K 9/00* (2006.01)

(52) U.S. Cl.
CPC ............. *H04N 9/735* (2013.01); *H04N 5/2351* (2013.01)
USPC ........................................ 348/223.1; 382/162

(58) Field of Classification Search
USPC ............ 348/223.1–225.1; 382/162–164, 274; 358/515–517
See application file for complete search history.

(56) References Cited

U.S. PATENT DOCUMENTS

| 7,932,931 | B2 * | 4/2011 | Ikeda et al. | 348/223.1 |
| 8,184,177 | B2 * | 5/2012 | Kakuta | 348/223.1 |
| 8,508,616 | B2 * | 8/2013 | Ikeda et al. | 348/223.1 |
| 2008/0266417 | A1 * | 10/2008 | Abe | 348/223.1 |
| 2009/0225226 | A1 * | 9/2009 | Kakuta | 348/655 |
| 2010/0182452 | A1 * | 7/2010 | Utsugi | 348/231.2 |
| 2010/0208098 | A1 * | 8/2010 | Ogawa | 348/223.1 |
| 2010/0231746 | A1 * | 9/2010 | Nomura | 348/223.1 |
| 2011/0176030 | A1 * | 7/2011 | Ikeda et al. | 348/223.1 |

FOREIGN PATENT DOCUMENTS

JP   2003-006631 A   1/2003

* cited by examiner

*Primary Examiner* — Kelly L Jerabek (74) *Attorney, Agent, or Firm* — Canon USA Inc IP Division (57) ABSTRACT

The present invention is directed to performing imaging processing for dividing a video signal obtained by an imaging unit into a plurality of areas, and detecting in parallel respective evaluation values of video signals of the plurality of areas, reducing the video signal obtained by the imaging unit, detecting an evaluation value of the reduced video signal, and controlling an operation of the imaging apparatus using either the evaluation values of video signals of the plurality of areas or the evaluation value of the reduced video signal.

17 Claims, 9 Drawing Sheets

IMAGING APPARATUS AND CONTROL METHOD FOR IMAGING APPARATUS INCLUDING IMAGE PROCESSING USING EITHER A REDUCED IMAGE OR A DIVIDED IMAGE

BACKGROUND OF THE INVENTION

1. Field of the Invention

The present invention relates to an imaging apparatus and a control method for the imaging apparatus and, more particularly, to a technique for dividing a video signal into a plurality of areas, and processing in parallel video signals in respective divided areas.

2. Description of the Related Art

In recent years, in imaging apparatuses including digital video cameras, a number of pixels which can be recorded has been increasing. The number of pixels which can be recorded by the imaging apparatus is also closely related to standards for monitors which display a video image recorded by the imaging apparatus. Specifically, the standards for monitors have shifted from a standard referred to as standard definition (SD) to a standard referred to as high definition (HD). The shift to the "standards for monitors" having a further higher resolution is scheduled in the coming years. The resolution of HD is mainly, horizontal 1920 pixels and vertical 1080 pixels (hereinafter, resolution is expressed as "(horizontal pixels)×(vertical pixels)" (expressed as "1920×1080" in this example)). The resolution of the "standard for monitor considered as the next generation" referred to as 4 k2 k is 3840×2160 pixels, which is a number of pixels four times as high as the HD. Further, a resolution of the standard planned in a digital cinema is 4096×2160 pixels, which is a higher number of pixels than 4 k2 k. Further, as the next generation further away than 4 k2 k, a standard referred to as 8k4k is also considered. The resolution of 8 k4 k is 7680×4320 pixels.

Along with such a change of the standards of monitors, high pixilation of images to be captured with respect to the number of pixels which can be recorded is required also in the imaging apparatus. For example, in order to be compatible with the monitor of 4 k2 k described above, the imaging apparatus needs to be provided with "a lens, an image sensor, a signal processing circuit for subjecting a video signal to digital processing, a video output large-scale integration (LSI) for outputting to the outside" and the like which are adapted to a high number of pixels. However, as the number of pixels gets higher, an information amount of a video signal output into one frame from an image sensor becomes larger. Accordingly, there are growing concerns about a problem that a signal processing circuit which performs digital processing becomes large-scaled. Japanese Patent Application Laid-Open No. 2003-006631 discusses a technique as a solution proposal of this problem. In the technique discussed in Japanese Patent Application Laid-Open No. 2003-006631, a plurality of signal processing circuits is provided. Then, the plurality of signal processing circuits processes the video signals in parallel. By doing so, speeding up and load distribution of a system are achieved.

Japanese Patent Application Laid-Open No. 2003-006631 discusses a technique in which an area of a video signal obtained by a high pixel sensor is divided into a plurality of sections. Then, image processing is performed in parallel by a plurality of signal processing circuits, on video signals of respective areas divided into a plurality of sections, and respective video signals which have been subjected to image processing are joined together. In the technique discussed in Japanese Patent Application Laid-Open No. 2003-006631, in a case where color-difference data to be used in white balance control, and luminance data to be used in exposure control are detected from a plurality of signal processing circuits, a resolution of areas where the color-difference data and the luminance data are detected become finer. Therefore, accuracies of the white balance control and the exposure control can be upgraded.

However, a microcomputer needs to acquire evaluation values of video images such as the color-difference data used for the white balance control, and the luminance data used for the exposure control, via communication media or the like from the plurality of signal processing circuits. As a result, there is a problem that it is not easy to speed up responsivity of the white balance control, and responsivity of the exposure control.

Further, in a case where the color-difference data and the luminance data used for the white balance and the exposure control are detected from an area across a part where a plurality of video signals is joined together, it is necessary to acquire these pieces of data from the plurality of signal processing circuits. For this reason, there is also a problem such that a communication system becomes complex, and it is necessary to calculate a plurality of evaluation values acquired from the plurality of signal processing circuits.

SUMMARY OF THE INVENTION

The present invention is directed to ensuring, when a video signal is divided into a plurality of areas, and video signals of respective divided areas are processed in parallel, that evaluation values of video images can be obtained at a high speed.

According to an aspect of the present invention, an imaging apparatus includes a division unit configured to divide a video signal obtained by an imaging unit into a plurality of areas, a first detection unit configured to detect in parallel respective evaluation values of video signals of the plurality of areas, a reduction unit configured to reduce the video signal obtained by the imaging unit, a second detection unit configured to detect an evaluation value of the reduced video signal, and an imaging processing unit configured to perform imaging processing for controlling an operation of the imaging apparatus, using either the evaluation value detected by the first detection unit or the evaluation value detected by the second detection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
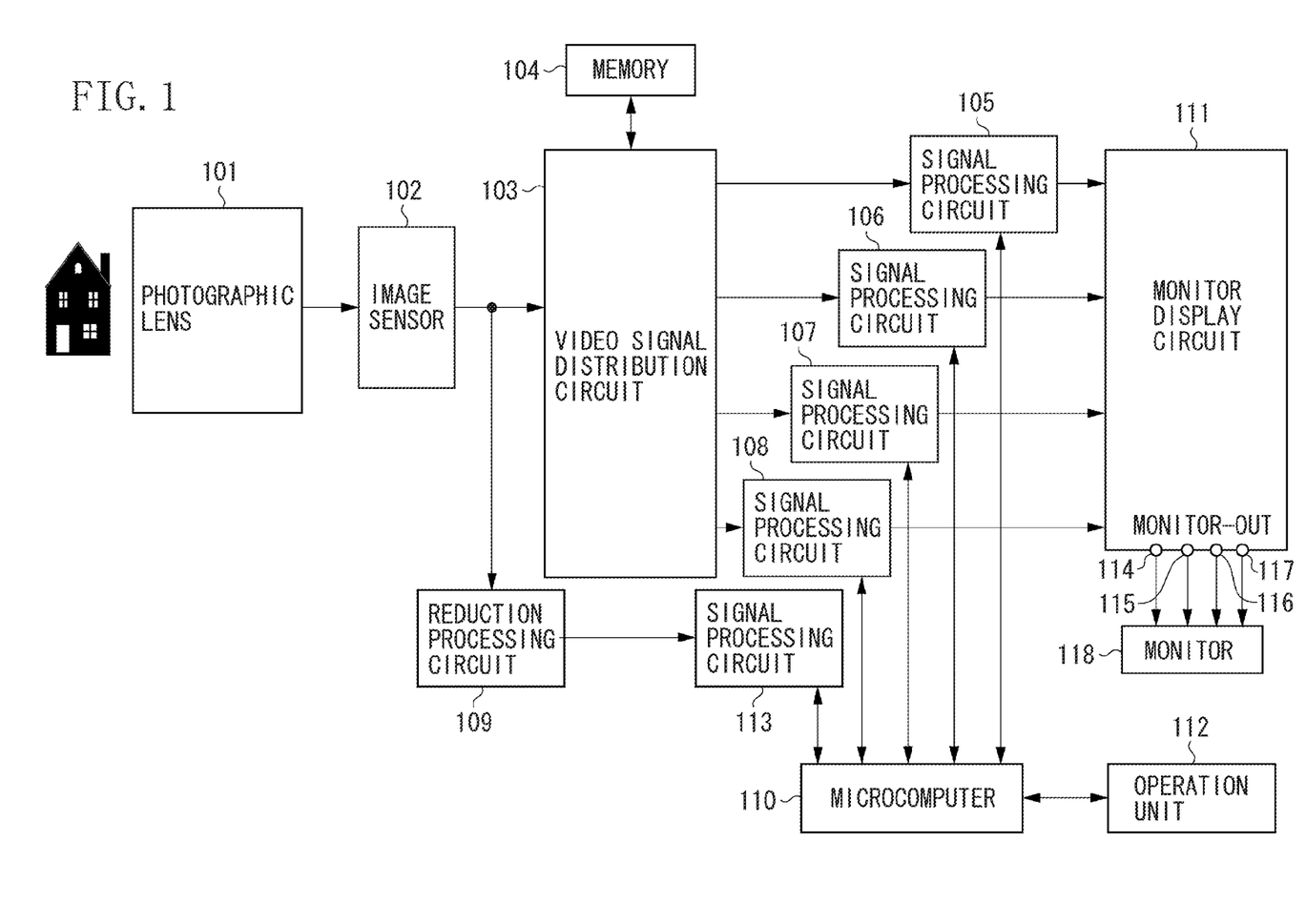
FIG. 1 is a block diagram illustrating a configuration of an imaging apparatus.

First, a first exemplary embodiment of the present invention will be described. FIG. 1 is a block diagram illustrating an example of a configuration of an imaging apparatus. A photographic lens 101 is, for example, an optical zoom lens. An image sensor 102 is an image sensor with a high number of pixels which converts an optical image formed by the photographic lens 101 into an electric signal. The image sensor 102 is, for example, a sensor of 4 k2 k. A video signal distribution circuit 103 divides an area of a video signal output from the image sensor 102 into a plurality of sections. A memory 104, when video signals are distributed by the video signal distribution circuit 103, is used to temporarily store the video signals.

Signal processing circuits 105 to 108 are used to perform signal processing of the video signals output from the video signal distribution circuit 103. A reduction processing circuit 109 is used to reduce (sizes of) high-pixel video signals output from the image sensor 102. A signal processing circuit 113 is used to perform signal processing of the video signals output from the reduction processing circuit 109. A microcomputer 110 is used to control a system of the entire imaging apparatus.

A monitor display circuit 111 is used to perform processing for displaying a moving image currently being captured on a monitor 118. Monitor output terminals 114 to 117 for video signals are electrically connected to the monitor 118. An operation unit 112 is operated by a user for giving various instructions to the imaging apparatus. The operation unit 112 includes, for example, a power switch for controlling a power source of the entire system of the imaging apparatus.

Figure 2A:
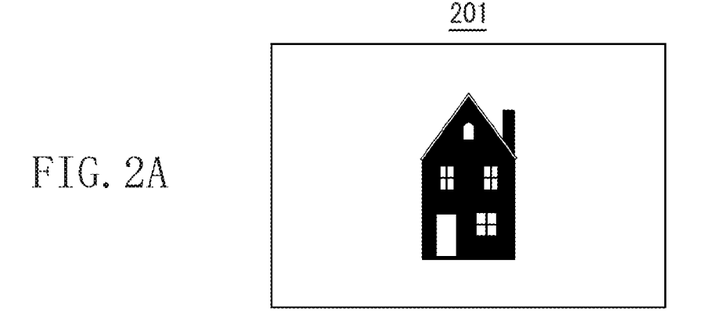
FIGS. 2A, 2B, 2C, and 2D illustrate various types of video signals.

Next, an example of an operation of the imaging apparatus will be described. A subject image formed by an incident light from the photographic lens 101 is converted into an electric signal by the image sensor 102, and is input into the video signal distribution circuit 103. The video signal distribution circuit 103 loads and stores once the input video signal into the memory 104. The video signal which has been loaded and stored into the memory 104 is divided into a plurality of areas and is output from the video signal distribution circuit 103. FIG. 2A conceptually illustrates an example of a video signal captured by the image sensor 102. A video signal 201 (picture) illustrated in FIGS. 2A to 2D is directly loaded and stored into the memory 104.

Figure 2B:
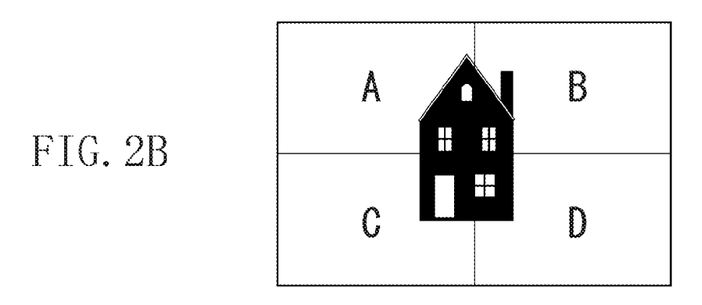

FIG. 2B conceptually illustrates an example of the video signal stored in the memory 104. In the present exemplary embodiment, the video signal distribution circuit 103, as illustrated in FIG. 2B, divides the video signal 201 into four areas: an area A, an area B, an area C, and an area D, and outputs the divided video signals to either of the signal processing circuits 105 to 108. The video signals divided into four areas are processed in parallel by a plurality of signal processing circuits 105 to 108 which pair up with respective areas. Specifically, in the present exemplary embodiment, the signal processing is performed on a video signal of the area A by the signal processing circuit 105, and the signal processing is performed on a video signal of the area B by the signal processing circuit 106. Further, the signal processing is performed on a video signal of the area C by the signal processing circuit 107, and the signal processing is performed on a video signal of the area D by the signal processing circuit 108. A number of divided video signals is not limited to four.

The signal processing circuits 105 to 108 perform in parallel white balance processing for manipulating tints/shades to the sight into a color close to a human memory color, nonlinear signal processing such as γ correction, and aperture processing for adding sharpness to an image (correcting a contour). The signal processing circuits 105 to 108 outputs the video signals which have been subjected to these signal processing, each to the monitor display circuit 111. The monitor display circuit 111 outputs (simultaneously) the video signals input from the signal processing circuits 105, 106, 107, and 108, each to the external monitor 118 via the monitor output terminals 114, 115, 116, and 117.

Figure 2C:
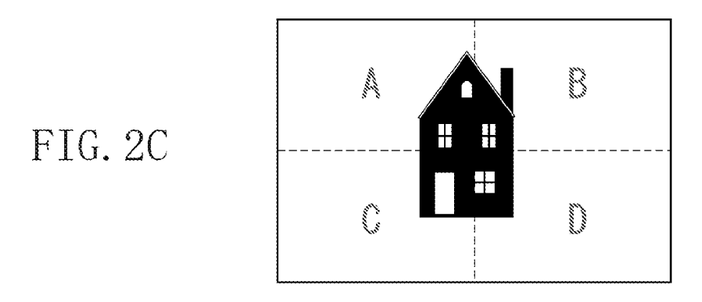

FIG. 2C conceptually illustrates an example of a video signal to be displayed on the monitor 118. In FIG. 2C, border lines of four areas, and A, B, C, and D are notated, for convenience of description, but actually, these are not displayed. The video signals output to the monitor 118 via the monitor output terminals 114 to 117 are displayed simultaneously on the monitor 118, as illustrated in FIG. 2C, as the video signals of four areas: the area A, the area B, the area C, and the area D. Accordingly, the user becomes able to appreciate as one video signal, the video signals captured by the imaging apparatus.

Figure 2D:
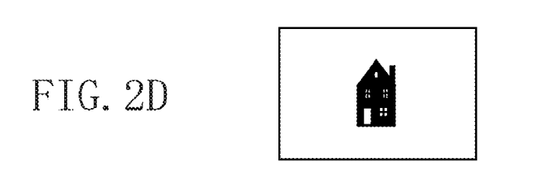

On the other hand, the reduction processing circuit 109 performs reduction processing on high pixel video signal output from the image sensor 102, and outputs the reduced video signal to the signal processing circuit 113. FIG. 2D conceptually illustrates an example of the reduced video signal. The reduction processing circuit 109 reduces a video signal, for example, with a pixel number of 4 k2 k to a video signal with a pixel number of 2 k. A reduction rate of the video signal in the reduction processing circuit 109 may be arbitrary. However, if reduction processing is performed to attain ¼ size (4 is a number of the signal processing circuits 105 to 108) of the video signal output from the image sensor 102, it is useful since a signal amount which is the same as that of the signal processing circuits 105 to 108 can be processed by the signal processing circuit 113. In the descriptions herein below, a video signal before it is reduced is referred to as an original image as needed, and a video signal which has been reduced is referred to as a reduced image as needed.

Figure 3A:
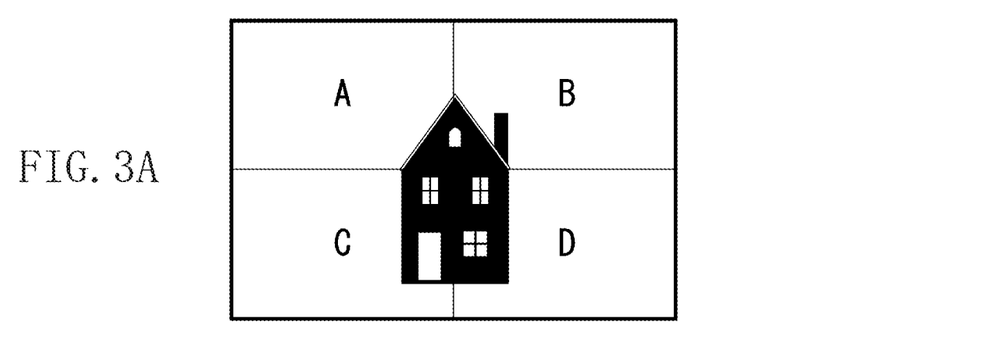
FIGS. 3A, 3B, and 3C illustrate detection frames in a signal processing circuit.

Next, an example of detection frames in the signal processing circuit, when detecting color-difference data used for the white balance control and luminance data used for the exposure control will be described. As described above, FIG. 2A conceptually illustrates an example of the video signal 201 captured by the image sensor 102. FIG. 3A illustrates an example of areas where signal processing is performed on the video signal 201 by the respective signal processing circuits 105 to 108. The video signal 201 is divided into four areas: the area A, the area B, the area C, and the area D, illustrated in FIG. 3A. The signal processing is performed in parallel on the video signals of respective areas by a plurality of signal processing circuits 105 to 108. As described above, the video signal of the area A is processed by the signal processing circuit 105, the video signal of the area B is processed by the signal processing circuit 106, the video signal of the area C is processed by the signal processing circuit 107, and the video signal of the area D is processed by the signal processing circuit 108.

Figure 3B:
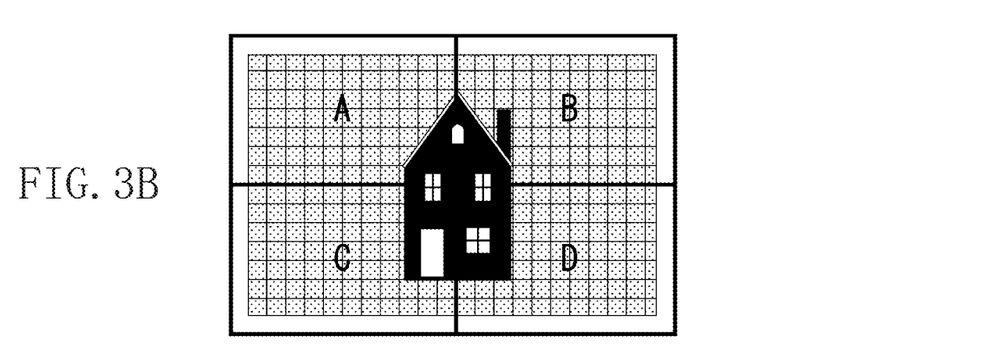

To upgrade an accuracy of "imaging processing for obtaining video images by controlling an operation of the imaging apparatus" such as the white balance and the exposure, it is desirable to perform the following. In other words, it is desirable to detect ""an evaluation value of an image" used for the imaging processing" such as the color-difference data used for the white balance control and the luminance data used for the exposure control, from the detection frames obtained by dividing as finely as possible the entire imaging screen. FIG. 3B illustrates an example of the detection frames of an evaluation value of the video signal, which is not subjected to reduction processing.

In the example illustrated in FIG. 3B, the detection frames are set each by dividing the area A into vertical 7 sections and horizontal 11 sections, the area B into vertical 7 sections and horizontal 11 sections, the area C into vertical 7 sections and horizontal 11 sections, and the area D into vertical 7 sections and horizontal 11 sections. The signal processing circuits 105 to 108 perform a first detection for detecting color-difference data from every one of these finely divided detection frames. By performing the white balance control using these pieces of color-difference data, the signal processing circuits 105 to 108 enable the white balance control with good accuracy. Similarly, the signal processing circuits 105 to 108 enable exposure control with good accuracy by detecting luminance data from every one of these finely divided detection frames, and performing exposure control using these pieces of luminance data.

However, when the white balance is controlled using the color-difference data obtained from the detection frames formed by dividing as finely as possible the entire imaging screen, data amount of the color-difference data becomes large, since the detection frames are fine. Hence, calculation processing will become large, and responsivity of the white balance control will become slow. Similarly, when an exposure is controlled using the luminance data obtained from the detection frames formed by dividing as finely as possible the entire imaging screen, a data amount of the luminance data will become large, since the detection frames are fine. Hence, calculation processing will become large, and responsivity of the exposure control will become slow.

Figure 3C:
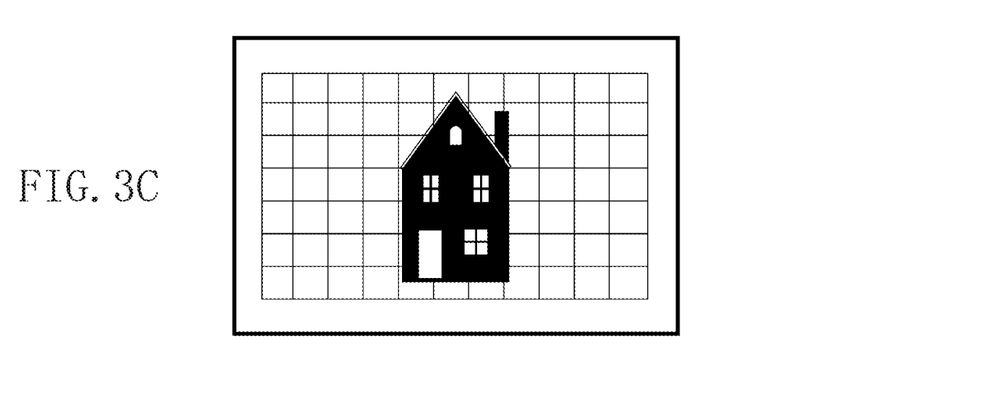

As described above, FIG. 2D conceptually illustrates an example of a video signal after subjecting the video signal captured by the image sensor 102 to reduction processing in the reduction processing circuit 109. FIG. 3C illustrates an example of the detection frames for acquiring evaluation values (the color-difference data used for the white balance control and the luminance data used for the exposure control) of the video signal which has been subjected to this reduction processing (reduced image) by the signal processing circuit 113.

As illustrated in FIG. 3C, the signal processing circuit 113 divides the entire reduced image into vertical 7 sections and horizontal 11 sections, and performs a second detection for detecting color-difference data and luminance data from every one of the detection frames. The microcomputer 110 performs the white balance control using the color-difference data detected by the signal processing circuit 113. A number of the color-difference data obtained in this process is smaller than a number of the color-difference data obtained from the detection frames with respect to the entire image (original image) which is not subjected to the reduction processing. For this reason, an accuracy of the white balance control becomes poor, but it becomes possible to make responsivity of the white balance faster. Similarly, the microcomputer 110 performs the exposure control using the luminance data detected by the signal processing circuit 113. The number of the luminance data obtained in this process is smaller than the number of the luminance data obtained from the detection frames with respect to the entire image which is not reduced. Consequently, an accuracy of the exposure control becomes poor, but it becomes possible to make responsivity of the exposure control fast.

Regarding the white balance control and the exposure control, there are a case where it is better to operate the control at high speed even if performance is rough, and a case where it is better to operate the control with accurate performance even if the responsivity is slow. For example, it is useful to switch between the cases depending on whether a state of the imaging apparatus is immediately after power-on of the imaging apparatus main body. Herein below, there will be described an example of an operation of the imaging apparatus when the white balance control and the exposure control are performed by switching between the cases depending on whether the state of the imaging apparatus is immediately after power-on of the imaging apparatus main body. In this regard, immediately after power-on (immediately after a power switch is turned on) of the imaging apparatus main body refers to a state since the power switch is turned on until startup processing (processing for enabling the start of imaging operation) of the imaging apparatus is completed.

First, referring to the flowchart in FIG. 4, an example of the processing of the imaging apparatus when the white balance control is performed will be described. First, in step S401, the microcomputer 110 determines whether the state of the imaging apparatus is immediately after the power switch included in the operation unit 112 has been turned on. As a result of the determination, if not immediately after the power switch has been turned on (NO in step S401), the process proceeds to step S405. Then, in step S405, the signal processing circuits 105 to 108 set the detection frames with respect to the video signal (original image) distributed by the video signal distribution circuit 103, for performing the white balance control with good accuracy. Then, the signal processing circuits 105 to 108 acquire color-difference data to be used for the white balance control from every one of the set detection frames. Next, in step S406, the signal processing circuits 105 to 108 and the microcomputer 110 perform the white balance control (the white balance low-speed processing), using the color-difference data acquired in step S405.

On the other hand, in step S401, if it is determined as immediately after the power switch has been turned on (YES in step S401), the process proceeds to step S402. Then, in step S402, the microcomputer 110 determines whether a mode for processing the white balance is a white balance high-speed mode for controlling the white balance at high speed. This determination can be made based on, for example, a content of an operation of the operation unit 112 by the user.

As a result of the determination, if a mode for processing the white balance is the white balance high-speed mode (YES in step S402), the process proceeds to step S403. Then, in step S403, the signal processing circuit 113 sets the detection frames with respect to a "video signal which has been subjected to reduction processing (reduced image)" output from the reduction processing circuit 109, and acquires color-difference data to be used for the white balance control from every one of the set detection frames.

Next, in step S404, the signal processing circuits 105 to 108, the microcomputer 110, and the signal processing circuit 113 perform the white balance control (the white balance high-speed processing) using the color-difference data acquired in step S403. The number of the color-difference data acquired in step S403 is smaller than the number of the color-difference data acquired in step S405 (refer to FIG. 3B and FIG. 3C). Hence, the white balance control in step S404 is performed at a higher speed than that of the white balance control in step S406.

As a result of the determination in step S402, if a mode for processing the white balance is a white balance low-speed mode for controlling the white balance at a low speed (NO in step S402), instead of the white balance high-speed mode, the process proceeds to step S405 described above. Then, as described above, the white balance low-speed processing using the color-difference data acquired from every one of the detection frames set with respect to the original image is executed.

Figure 5:
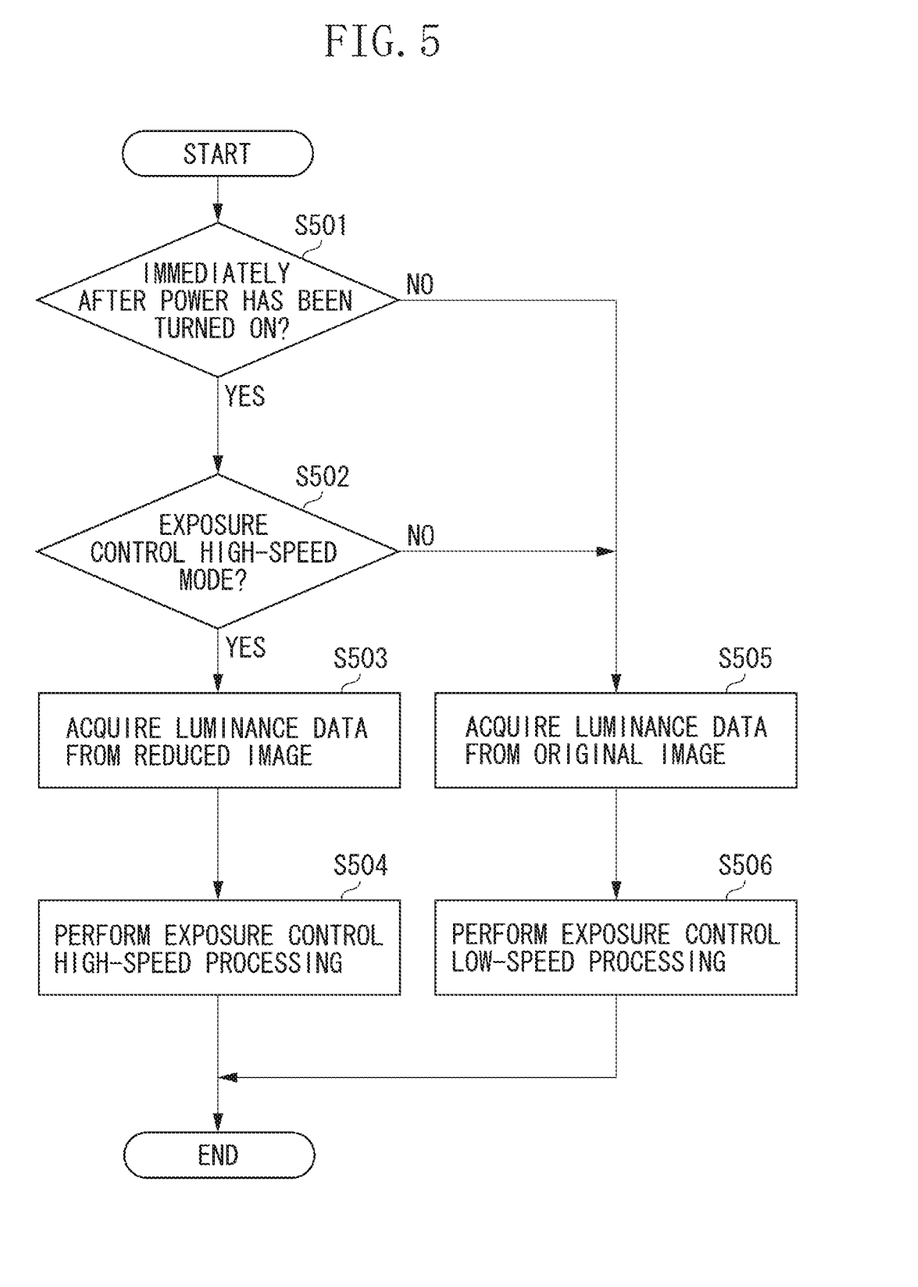
FIG. 5 is a flowchart illustrating processing when an exposure control is performed.

Next, referring to the flowchart in FIG. 5, an example of the processing of the imaging apparatus when the exposure control is performed will be described. First, in step S501, the microcomputer 110 determines whether the state of the imaging apparatus is immediately after the power switch included in the operation unit 112 has been turned on. As result of this determination, if not immediately after the power switch has been turned on (NO in step S501), the process proceeds to step S505. Then, the signal processing circuits 105 to 108 sets the detection frames with respect to the video signal (original image) distributed by the video signal distribution circuit 103 to perform the exposure control with good accuracy. Then, the signal processing circuits 105 to 108 acquire luminance data to be used for the exposure control from every one of the set detection frames. Next, in step S506, the signal processing circuits 105 to 108 and the microcomputer 110 perform the exposure control (exposure control low-speed processing) using the luminance data acquired in step S505.

On the other hand, in step S501, if it is determined as immediately after the power switch has been turned on (YES in step S501), the process proceeds to step S502. Then, in step S502, the microcomputer 110 determines whether the mode of the exposure control is an exposure control high-speed mode for performing the exposure control at high speed. This determination can be made based on, for example, a content of an operation of the operation unit 112 by the user.

As a result of this determination, if the mode of the exposure control is the exposure control high-speed mode (YES in step S502), the process proceeds to step S503. Then, in step S503, the signal processing circuit 113 sets the detection frames with respect to the "video signal which has been subjected to reduction processing (reduced image)" output from the reduction processing circuit 109 and acquires the luminance data to be used for the exposure control from every one of the set detection frames. Next, in step S504, the signal processing circuits 105 to 108, the microcomputer 110, and the signal processing circuit 113 perform the exposure control (exposure control high-speed processing), using the luminance data acquired in step S503. The number of the luminance data acquired in step S503 is smaller than the number of the luminance data acquired in step S505 (refer to FIG. 3B and FIG. 3C). Hence, the exposure control in step S504 is performed at higher speed than that of the exposure control in step S506.

As a result of the determination in step S502, if the mode of the exposure control is an exposure control low-speed mode for performing the exposure control at low speed (NO in step S502), instead of the exposure control high-speed mode, the process proceeds to step S505 described above. Then, as described above, the exposure control low-speed processing using the luminance data acquired from every one of the detection frames set for the original image is executed.

In the present exemplary embodiment as described above, an evaluation value of the video signal (the color-difference data and the luminance data) to be used for performing the imaging processing (the white balance control and the exposure control), is detected from every one of the detection frames set with respect to the reduced image obtained by reducing the captured video signal. Therefore, the microcomputer 110 only needs to acquire an evaluation value from the signal processing circuit 113, and the need for acquiring the evaluation value from each of the signal processing circuits 105 to 108 is eliminated. When the video signal is processed in parallel by the plurality of signal processing circuits 105 to 108, the evaluation value of the video image can be acquired at high speed.

Further, when immediately after the power switch of the imaging apparatus main body has been turned on, and the mode of the imaging apparatus is set to a mode for performing the imaging processing at (relatively) high speed, it is useful to shorten a time taken for the imaging processing (the white balance control and exposure control). Thus, in the present exemplary embodiment, an attempt has been made to detect an evaluation value of the reduced image obtained by reducing the captured video signal, from every one of the detection frames set with respect to the reduced image, and to perform imaging processing using the evaluation values. On the other hand, when the state of the imaging apparatus is not immediately after the power switch of the imaging apparatus main body has been turned on, and when the mode of the imaging apparatus is set to a mode for performing the imaging processing at (relatively) low speed, it is useful to perform the following. Specifically, it is useful to place greater emphasis on performing imaging processing (the white balance control and exposure control) with high accuracy than shortening a time taken for the imaging processing. Thus, in the present exemplary embodiment, an attempt has been made to detect an evaluation value of the captured video signal (original image), from every one of the detection frames set with respect to the original image, and to perform imaging processing using the evaluation values. In the present exemplary embodiment, as described above, an attempt has been made to switch according to necessary conditions, between a case of operating the white balance control and exposure control at low speed in order to perform these controls with good accuracy, and a case of operating the white balance control and exposure control at high speed even if accuracy is rough. Therefore, it becomes possible to upgrade performance of the white balance control and exposure control.

Figure 4:
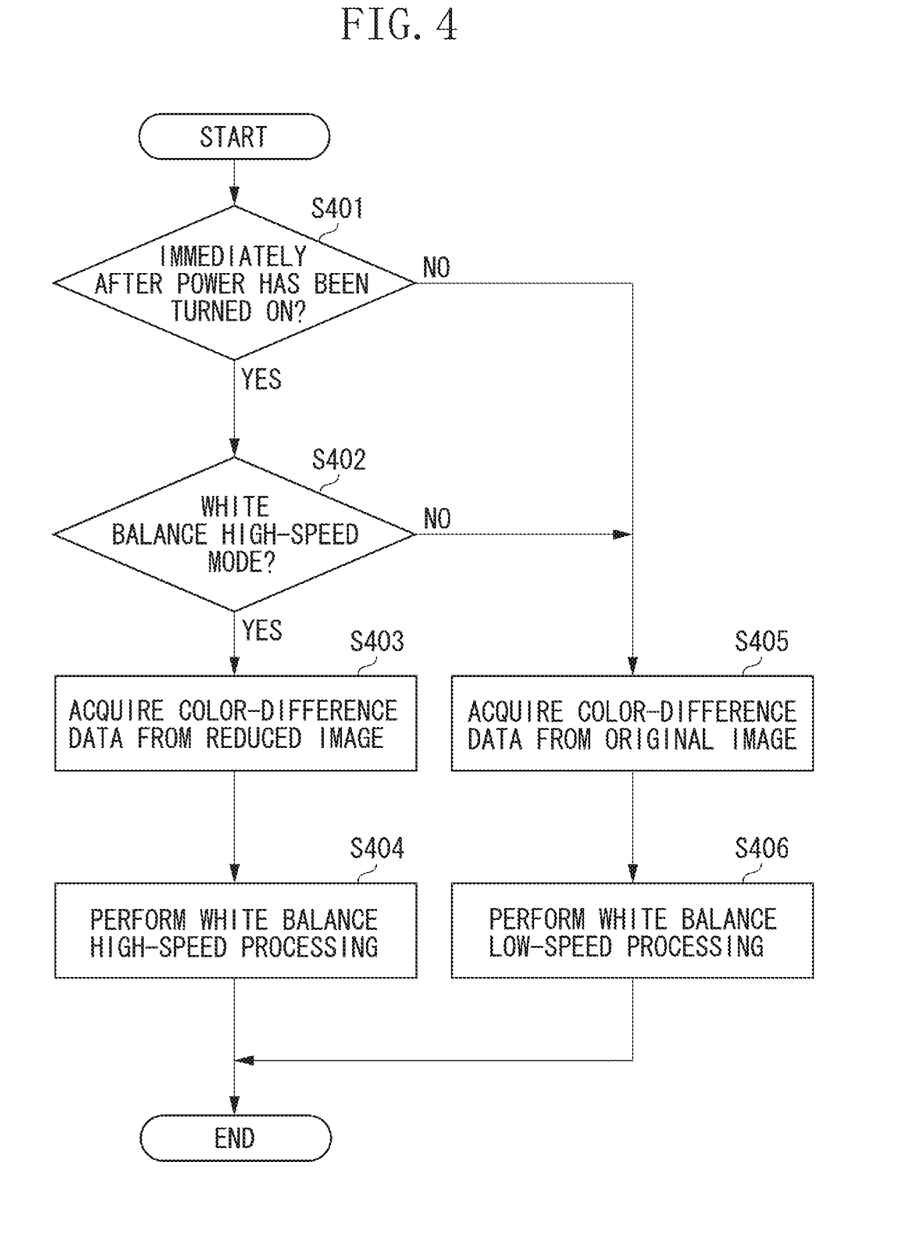
FIG. 4 is a flowchart illustrating first processing when a white balance control is performed.

It is not always necessary to perform the one of the determinations in step S401 and S402 in FIG. 4. Similarly, it is not always necessary to perform the one of the determinations in step S501 and S502 in FIG. 5.

Next, a second exemplary embodiment of the present invention will be described. In the first exemplary embodiment, when the imaging apparatus is in the white balance high-speed mode immediately after the imaging apparatus has been powered on, the color-difference data is acquired from the reduced image, and in other cases, the color-difference data is acquired from the original image. In contrast, in the present exemplary embodiment, when the white balance mode is a white balance setting mode, the color-difference data is acquired from the reduced image, and when the white balance mode is an auto white balance mode, the color-difference data is acquired from the original image. This is a main difference between the present exemplary embodiment and the first exemplary embodiment. Therefore, in the descriptions of the present exemplary embodiment, identical parts to the first exemplary embodiment are assigned identical reference numerals to the ones assigned to FIG. 1 to FIG. 5 and detailed descriptions thereof will not be repeated.

A configuration of the imaging apparatus is the same as the one illustrated in FIG. 1. However, in the present exemplary embodiment, a white balance mode switch for the user to switch between the white balance modes is included in the operation unit 112. In the present exemplary embodiment, the white balance modes include two types of modes: the white balance setting mode and the auto white balance mode. Further, the signal processing circuit 113 can set the detection areas with necessary positions and sizes from the entire image captured by the image sensor 102, and can easily acquire the color-difference data.

Figure 6A:
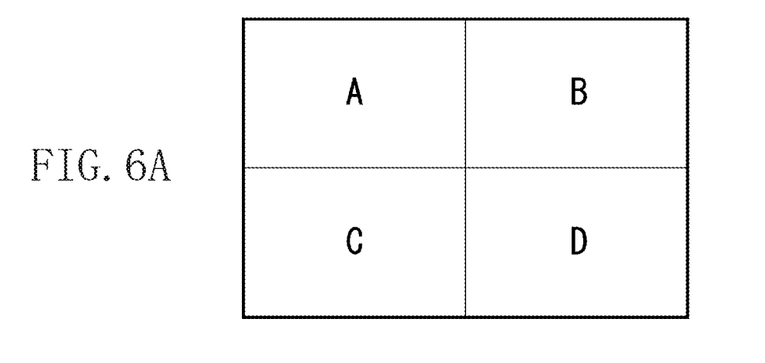
FIGS. 6A, 6B, and 6C illustrate detection areas of color-difference data.
Figure 6B:
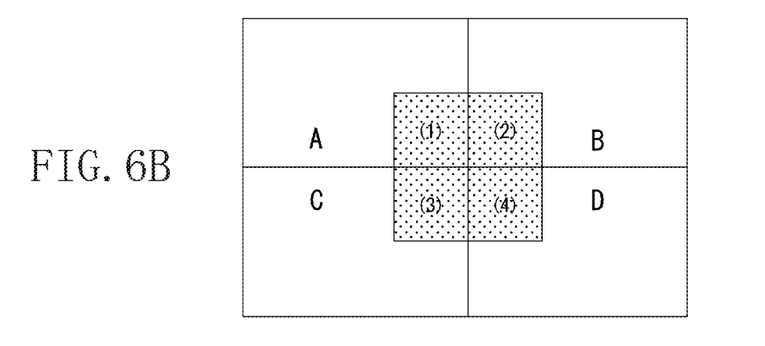

Next, there will be described an example of detection areas in the signal processing circuit when the color-difference data to be used for the white balance control is detected. FIG. 6A illustrates an example of an imaging plane of the image sensor 102. In FIG. 6A, the imaging plane is divided into four sections: an area A, an area B, an area C, and an area D, and respective areas are processed in parallel by the signal processing circuits 105 to 108. FIG. 6B illustrates an example of areas on which signal processing is performed by each of the signal processing circuits 105 to 108. The signal processing is performed on the area A by the signal processing circuit 105. The signal processing is performed on the area B by the signal processing circuit 106. The signal processing is performed on the area C by the signal processing circuit 107. The signal processing is performed on the area D by the signal processing circuit 108. Also in the present exemplary embodiment, a number of divisions of the video signal is not limited to four.

The color-difference data necessary for executing the white balance setting function is detected from a central part which is a part of the imaging screen. Accordingly, the area for detecting the color-difference data are distributed into an area (1), an area (2), an area (3), and an area (4), as illustrated in FIG. 6B. Therefore, processing for collectively acquiring color-difference data of respective areas to generate anew evaluation value is necessary. To this end, the microcomputer 110 needs to communicate with the respective signal processing circuits 105 to 108, and to acquire the color-difference data of the area (1), the area (2), the area (3), and the area (4). Hence, the system is complex.

Figure 6C:
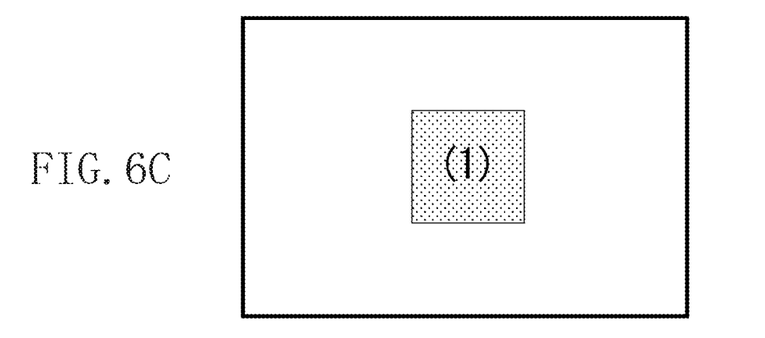

FIG. 6C illustrates an example of an area on which the signal processing is performed by circuit 113. As illustrated in FIG. 6C, the signal processing circuit 113, when executing the white balance setting, detects the color-difference data taking the central part (an area (1)) of a "video signal which has been subjected to reduction processing (reduced image)" output from the reduction processing circuit 109 as a detection area. In this way, when executing the white balance setting function, the signal processing circuit 113 needs to detect the color-difference data only from the area (1) illustrated in FIG. 6C, and the microcomputer 110 can acquire color-difference data by performing communication only with the signal processing circuit 113. On the other hand, when the auto white balance function is executed, the signal processing circuits 105 to 108 detect the color-difference data from areas (1) to (4) illustrated in FIG. 6B, and the microcomputer 110 acquires the color-difference data by performing communication with each of the signal processing circuits 105 to 108.

Next, an example of operations of the microcomputer 110 and the signal processing circuit 113 when controlling the white balance setting will be described. When the white balance setting mode is selected, as a preliminary preparation, the user positions white paper at the central part of the imaging screen. Then, the imaging apparatus images the white paper, and executes the white balance setting. Then, the signal processing circuit 113 detects color-difference data for the central part of the imaging screen. The microcomputer 110 adjusts the white balance by changing R-gain and B-gain such that the color-difference data detected by the signal processing circuit 113 becomes a predetermined value. The signal processing circuit 113 sets the detection frames at the central part of the video signal (imaging screen) which has been subjected to the reduction processing by the reduction processing circuit 109, and detects the color-difference data from every one of the set detection frames (refer to the area (1) in FIG. 6C).

Next, an example of operations of the microcomputer 110 and the signal processing circuits 105 to 108 in a case of controlling the auto white balance will be described. When the auto white balance mode is selected, the signal processing circuits 105 to 108 detect color-difference data from the detection frames formed by finely dividing the entire screen. Then, the microcomputer 110 extracts the color-difference data as a standard of white extraction from the detected color-difference data, and adjusts the white balance by changing the R-gain and B-gain such that the extracted color-difference data becomes the predetermined value. In this regard, detection accuracy of the color-difference data becomes higher when the color-difference data is detected from the areas where resolution is fine. For this reason, in the auto white balance mode, instead of detecting the color-difference data from the video signal which has been subjected to the reduction processing, the signal processing circuits 105 to 108 set the detection frames whose each of the screen is finely divided, and detect the color-difference data from every one of the detection frames. For example, when the signal processing circuits 105 to 108 perform signal processing on the four areas illustrated in FIG. 3A, the detection frames are formed into mesh-like fine divided frames, as illustrated in FIG. 3B.

Figure 7:
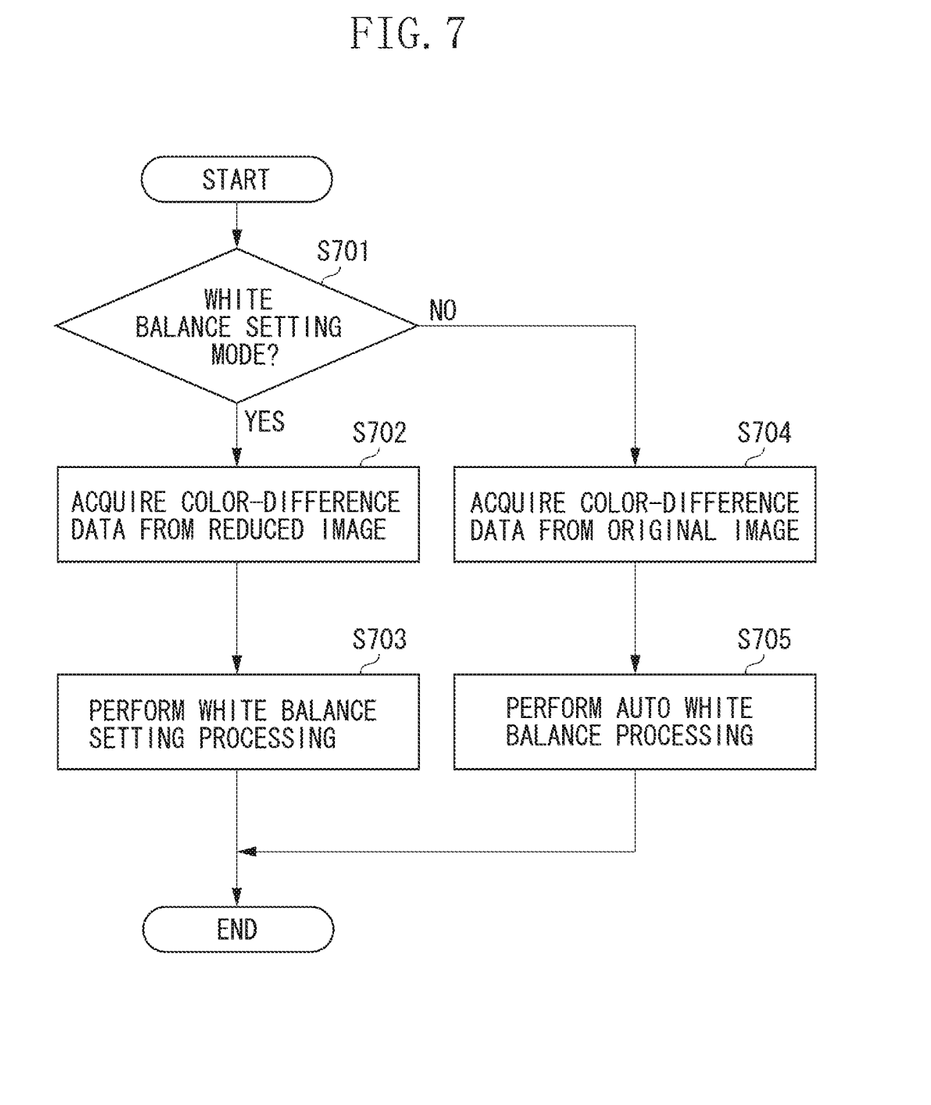
FIG. 7 is a flowchart illustrating second processing when the white balance control is performed.

Next, referring to the flowchart in FIG. 7, an example of processing of the imaging apparatus when the white balance control is performed will be described. First, in step S701, the microcomputer 110 detects a state of the white balance mode switch included in the operation unit 112, and determines whether the white balance setting mode is selected as the white balance mode. As a result of the determination, if the white balance setting mode is selected (YES in step S701), the process proceeds to step S702. Then, in step S702, the signal processing circuit 113 detects color-difference data to be used for the processing of the white balance setting, from the central part of the screen of the reduced image. Thereafter, in step S703, the microcomputer 110 performs the processing of the white balance setting, using the color-difference data detected in step S702.

In step S701, if the auto white balance mode is selected as the white balance mode (NO in step S701), instead of the white balance setting mode, the process proceeds to step S704. Then, in step S704, the signal processing circuits 105 to 108 detect color-difference data to be used for the processing of the auto white balance from the original image output from the video signal distribution circuit 103. Thereafter, in step S705, the microcomputer 110 performs the processing of the auto white balance using the color-difference data detected in step S704.

In the present exemplary embodiment as described above, when the white balance set is executed, it is necessary to acquire color-difference data of the central part across the four areas formed by dividing the original image. Thus, when the white balance setting is executed, an attempt has been made to acquire color-difference data of the central part of the reduced image of the original image, and to perform the processing of the white balance using the acquired color-difference data. Therefore, a system such as communication when the microcomputer 110 acquires the color-difference data is simplified, and as a result, calculation using the color-difference data by the microcomputer 110 becomes easy. On the other hand, when the auto white balance is executed, the color-difference data to be acquired is the color-difference data of the entire four areas. Thus, when the auto white balance is executed, the color-difference data is acquired from every one of four areas formed by dividing the original image, and the processing of the white balance is performed using the acquired color-difference data. Therefore, the white balance can be performed with high accuracy.

The first exemplary embodiment and the second exemplary embodiment can be combined. For example, if it is determined as NO in steps S401 and S402, it is determined whether the white balance mode is which of the white balance setting mode and the auto white balance mode. Then, depending on a result of the determination, the processing in step S702 and S703 or step S704 and S705 is performed.

Next, a third exemplary embodiment will be described. In the present exemplary embodiment, when the light metering mode is a center-weighted averaged light metering mode, luminance data is acquired from the reduced image. When the light metering mode is an evaluative light metering mode, luminance data is acquired from the original image. This is a main difference between the present exemplary embodiment and the first and the second exemplary embodiments. Therefore, in the descriptions of the present exemplary embodiment, identical parts to the first, and the second exemplary embodiments are assigned identical reference numerals to the ones assigned to FIG. 1 to FIG. 7 and detailed descriptions thereof will not be repeated.

A configuration of the imaging apparatus is the same as the one illustrated in FIG. 1. However, a light metering type selector switch for a user to switch between the light metering modes is included in the operation unit 112. In the present exemplary embodiment, the light metering modes include two types: the center-weighted averaged light metering mode and the evaluative light metering mode. Further, the signal processing circuit 113 can set detection areas with necessary positions and sizes from the entire image captured by the image sensor 102, and can easily acquire luminance data.

Figure 8A:
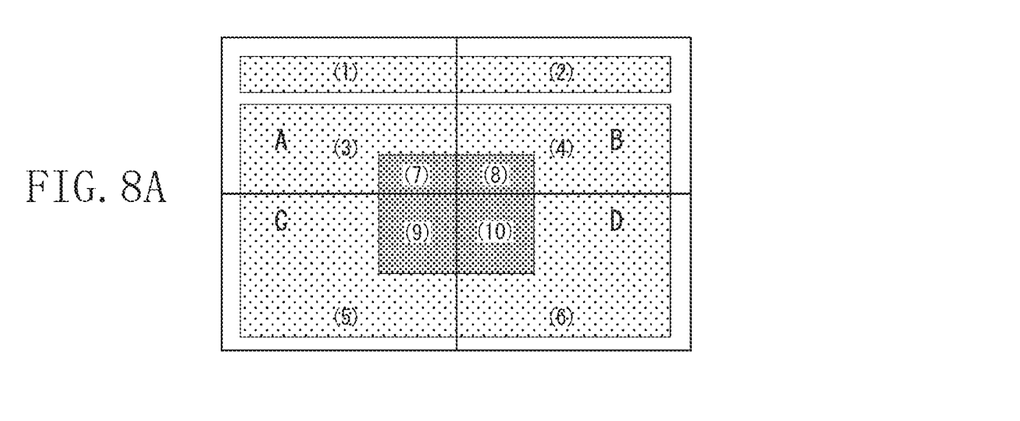
FIGS. 8A and 8B illustrate detection areas of luminance data.

Next, an example of detection areas in the signal processing circuit, when detecting the luminance data to be used for the light metering, will be described. FIG. 8A illustrates an example of areas on which the signal processing is performed by each of the signal processing circuits 105 to 108. An imaging plane of the image sensor 102 is, for example, the one illustrated in FIG. 6A. The imaging plane of the image sensor 102 is divided into four sections: the signal processing circuits 105 to 108 perform the signal processing in parallel on an area A, an area B, an area C, and an area D, and respective areas are processed. Also in the present exemplary embodiment, the number of divisions of the video signal is not limited to four.

In the example illustrated in FIG. 6A, The signal processing is performed on the area A by the signal processing circuit 105. The signal processing is performed on the area B by the signal processing circuit 106. The signal processing is performed on the area C by the signal processing circuit 107. The signal processing is performed on the area D by the signal processing circuit 108. In this case, the luminance data necessary for the center-weighted averaged light metering value is distributed into the area (1), the area (2), the area (3), the area (4), the area (5), the area (6), the area (7), the area (8), the area (9), and the area (10) as illustrated in FIG. 8A. Therefore, processing for collectively acquiring the luminance data of respective areas and generating a new evaluation value becomes necessary.

Especially when obtaining a center-weighted averaged light metering value, in order to eliminate the influence of sky on an upper part of the screen as much as possible, the microcomputer 110 generates an evaluation value of the upper part of the screen from the area (1) and the area (2). Further, the microcomputer 110 generates an evaluation value of the entire screen from the area (3), the area (4), the area (5), and the area (6). Further, the microcomputer 110, in order to perform weighting on an influence of the central part which is a part of the imaging screen, generates an evaluation value from the area (7), the area (8), the area (9), and the area (10). Therefore, the microcomputer 110 necessitates processing for generating a final evaluation value from three generated evaluation values. Then, in order to generate the evaluation value, the microcomputer 110 must acquire the luminance data of the areas (1) to (10) through communications with the signal processing circuits 105 to 108. Hence, a system such as communication is complex.

Figure 8B:
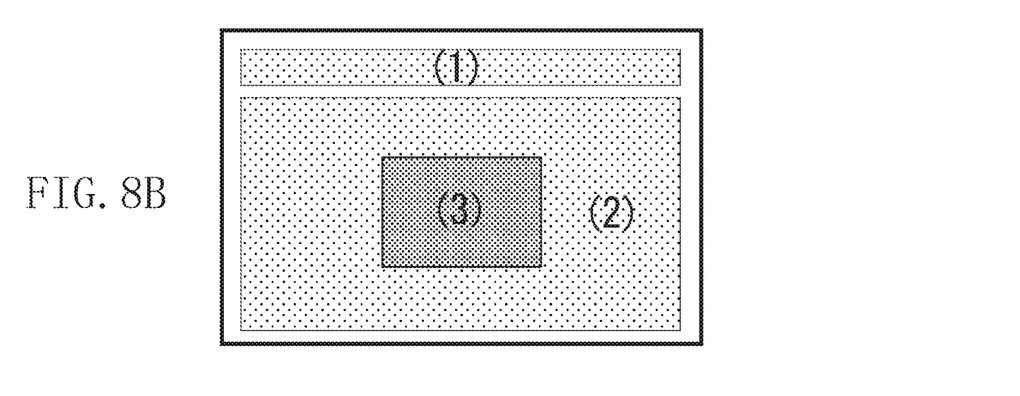

FIG. 8B illustrates an example of areas on which the signal processing is performed by the signal processing circuit 113. As illustrated in FIG. 8B, the signal processing circuit 113, when executing the center-weighted averaged light metering, detects luminance data from a "video signal which has been subjected to reduction processing (reduced image)" output from the reduction processing circuit 109. Specifically, the signal processing circuit 113 detects luminance data of the upper part of the screen (the area (1)), the entire part (the area (2)) excluding the upper part of the screen, and the central part (the area (3)) as the detection areas. In this way, when executing the center-weighted averaged light metering, the signal processing circuit 113 needs to detect luminance data only from the areas (1) to (3), illustrated in FIG. 8B, and the microcomputer 110 can acquire the luminance data by performing communication only with the signal processing circuit 113. On the other hand, when executing evaluative light metering, the signal processing circuits 105 to 108 detect luminance data from the areas (1) to (10) illustrated in FIG. 8A, and the microcomputer 110 acquires the luminance data by performing communication with each of the signal processing circuits 105 to 108.

Next, an example of operations of the microcomputer 110 and the signal processing circuit 113 when the center-weighted averaged light metering is executed will be described. When the center-weighted averaged light metering mode is selected, the signal processing circuit 113 detects luminance data from every one of the areas: an area of the upper part of the screen for detecting a sky, the entire area, and the area in the central part. At this time, the signal processing circuit 113 sets the detection frames to "the area in the upper part of the screen, the entire area, and the area in the central part" of the video signal which has been subjected to the reduction processing by the reduction processing circuit 109, and detects luminance data from these areas (refer to the areas (1) to (3) in FIG. 8B).

Next, an example of operations of the microcomputer 110 and the signal processing circuits 105 to 108 in a case of executing the evaluative light metering will be described. When the evaluative light metering mode is selected, the signal processing circuits 105 to 108 detect luminance data from the detection frames formed by finely dividing the entire screen. Then, the microcomputer 110 predicts a subject from a distribution of the detected luminance data, and determines a target value of the exposure control. In this regard, detection accuracy of the luminance data is higher, when the luminance data is detected from the areas with finer resolution. For this reason, in the evaluative light metering mode, instead of detecting luminance data from the video signal which has been subjected to the reduction processing, the signal processing circuits 105 to 108 set the detection frames each formed by finely dividing the screen, and detects luminance data from every one of the detection frames. For example, when the four areas illustrated in FIG. 3A are processed by the signal processing circuits 105 to 108, the detection frames are formed into mesh-like fine divided frames as illustrated in FIG. 3B.

Figure 9:
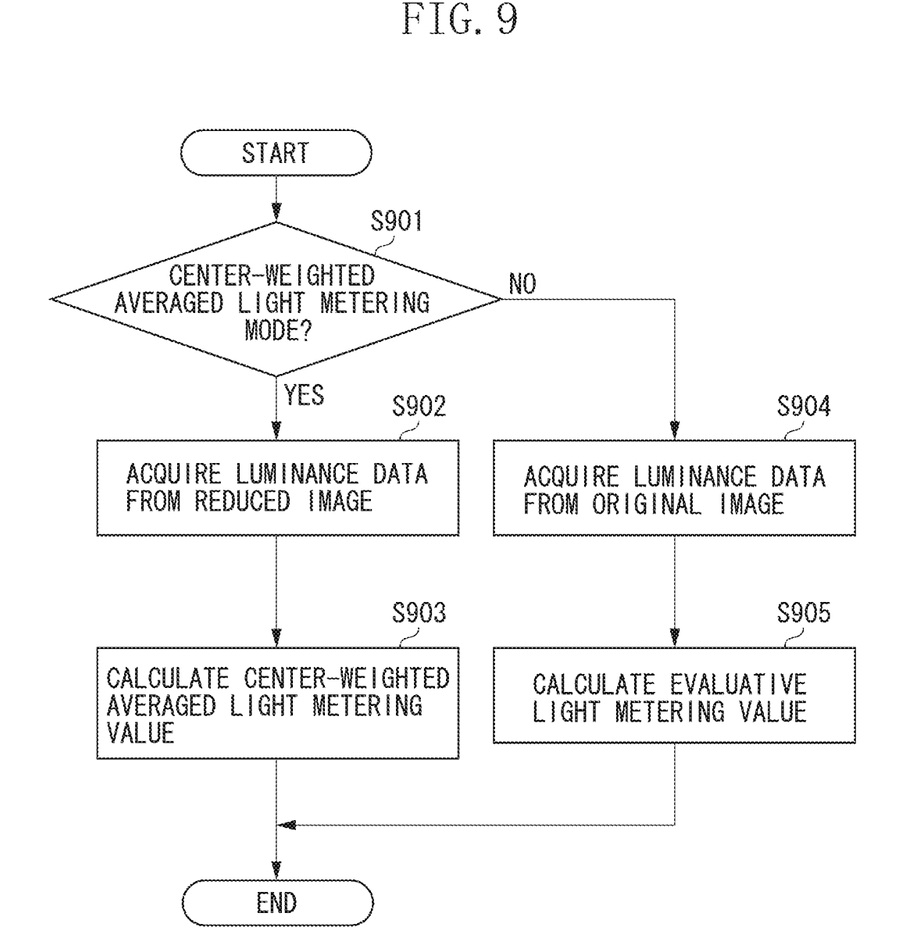
FIG. 9 is a flowchart illustrating processing when light metering is performed.

Next, referring to the flowchart in FIG. 9, an example of the processing of the imaging apparatus when the light metering is performed will be described. First, in step S901, the microcomputer 110 detects a state of the light metering type selector switch included in the operation unit 112, and determines whether the center-weighted averaged light metering mode is selected as the light metering mode. As a result of the determination, if the center-weighted averaged light metering mode is selected (YES in step S901), the process proceeds to step S902. Then, in step S902, the signal processing circuit 113 detects luminance data to be used for calculation of a center-weighted averaged light metering value, from the reduced image. Thereafter, in step S903, the microcomputer 110 calculates the center-weighted averaged light metering value using the luminance data detected in step S902.

In step S901, if the evaluative light metering mode is selected as the light metering mode, instead of the center-weighted averaged light metering mode (NO in step S901), the process proceeds to step S904. Then, in step S904, the signal processing circuits 105 to 108 detect luminance data to be used for calculation of an evaluative light metering value, from the original image output from the video signal distribution circuit 103. Thereafter, in step S905, the microcomputer 110 calculates the evaluative light metering value, using the luminance data detected in step S904.

As described above, in the present exemplary embodiment, when the center-weighted averaged light metering value is calculated, it is necessary to acquire luminance data of apart including the central part across the four areas formed by dividing the original image. Thus, when the center-weighted averaged light metering value is calculated, an attempt has been made to acquire luminance data from the reduced image of the original image, and to calculate the center-weighted averaged light metering value using the acquired luminance data. Therefore, a system such as communication when the microcomputer 110 acquires the luminance data is simplified, and as a result, calculation using the luminance data by the microcomputer 110 is easy.

The first exemplary embodiment and the third exemplary embodiments can be combined. For example, if it is determined as NO in steps S501 and S502, it is determined whether the light metering mode is which of the center-weighted averaged light metering mode, and the evaluative light metering mode. Then, the processing in step S902 and S903 or in step S904 and S905 is performed, depending on a result of the determination.

The exemplary embodiments described above only illustrate an example of materialization for the implementation of the present invention, and technical scope of the present invention should not be construed in a limited way by these. In other words, the present invention can be implemented in various forms without departing from technological thoughts thereof, or principal features thereof.

OTHER EMBODIMENTS

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., non-transitory computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-149084 filed Jul. 5, 2011, which is hereby incorporated by reference herein in its entirety.

What is claimed is:

1. An imaging apparatus comprising:
    a division unit configured to divide an image signal obtained by an imaging unit into a plurality of areas;
    a first detection unit configured to detect in parallel respective evaluation values of image signals of the plurality of areas;
    a reduction unit configured to reduce the image signal obtained by the imaging unit;
    a second detection unit configured to detect a further evaluation value of the reduced image signal, wherein the further evaluation value detected by the second detection unit is a different evaluation value from the parallel evaluation values detected by the first detection unit; and
    an imaging processing unit configured to perform imaging processing using either one or more of the parallel evaluation values detected by the first detection unit or the further evaluation value detected by the second detection unit.

2. The imaging apparatus according to claim 1, further comprising:
    a determination unit configured to determine whether one or more of the parallel evaluation values detected by the first detection unit or further the evaluation values detected by the second detection unit is used to perform imaging processing by the imaging processing unit based on at least either one of a state of the imaging apparatus and a mode of the imaging processing,
    wherein the imaging processing unit is configured to perform imaging processing using the evaluation value determined by the determination unit.

3. The imaging apparatus according to claim 2, wherein the imaging processing unit is configured to perform relatively high-speed imaging processing and relatively low-speed imaging processing, which are imaging processing of identical content, and
    wherein the determination unit is configured, when the relatively high-speed imaging processing is performed, to determine that imaging processing is performed using the further evaluation value detected by the second detection unit, and configured, when the relatively low-speed imaging processing is performed, to determine that imaging processing is performed using one or more of the parallel evaluation values detected by the first detection unit.

4. The imaging apparatus according to claim 3, wherein the imaging processing includes processing for controlling a white balance or processing for controlling an exposure,
wherein the evaluation value when the white balance is controlled includes color-difference data, and
wherein the evaluation value when the exposure is controlled includes luminance data.

5. The imaging apparatus according to claim 2, wherein the determination unit is configured, before startup processing of the imaging apparatus is completed, to determine that imaging processing is performed using the further evaluation value detected by the second detection unit, and configured, after startup processing of the imaging apparatus is completed, to determine that imaging processing is performed using one or more of the parallel evaluation values detected by the first detection unit.

6. The imaging apparatus according to claim 2, wherein the determination unit is configured, when imaging processing is performed using evaluation values detected from an area of a part of an imaging screen, which is an area across the plurality of areas, to determine that imaging processing is performed using the further evaluation value detected by the second detection unit, and configured, when imaging processing is performed using an evaluation value detected from the entire imaging screen, to determine that imaging processing is performed using one or more of the parallel evaluation values detected by the first detection unit.

7. The imaging apparatus according to claim 6, wherein the imaging processing includes processing for executing an auto white balance function, and processing for executing a white balance setting function to adjust white balance based on data of a central part of an imaging screen of a white subject,
wherein the evaluation value includes color-difference data, and
wherein the determination unit is configured, when the auto white balance function is executed, to determine that imaging processing is performed using the further evaluation value detected by the second detection unit, and configured, when the white balance setting function is executed, to determine that imaging processing is performed using one or more of the parallel evaluation values detected by the first detection unit.

8. The imaging apparatus according to claim 6, wherein the imaging processing includes detection of a center-weighted averaged light metering value, and detection of an evaluative light metering value,
wherein the evaluation value includes luminance data, and
wherein the determination unit is configured, when detection of the center-weighted averaged light metering value is performed, to determine that imaging processing is performed using the further evaluation value detected by the second detection unit, and configured, when detection of the evaluative light metering value is performed, to determine that imaging processing is performed using one or more of the parallel evaluation values detected by the first detection unit.

9. A control method for an imaging apparatus comprising:
dividing an image signal obtained by an imaging apparatus into a plurality of areas;
performing a first detection for detecting in parallel respective evaluation values of image signals of the plurality of areas;
reducing the image signal obtained by the imaging apparatus;
performing a second detection for detecting a further evaluation value of the reduced image signal, wherein the further evaluation value detected by the second detection is a different evaluation value from the parallel evaluation values detected by the first detection; and
performing imaging processing using either one or more of the parallel evaluation values detected by the first detection or the further evaluation value detected by the second detection.

10. The control method for the imaging apparatus according to claim 9, further comprising:
determining whether one or more of the parallel evaluation values detected by the first detection or the further evaluation value detected by the second detection is used to perform imaging processing by the imaging processing unit based on at least either one of a state of the imaging apparatus and a mode of the imaging processing,
wherein the imaging processing performs imaging processing using the evaluation value determined by the determination.

11. The control method for the imaging apparatus according to claim 10, wherein the imaging processing performs relatively high-speed imaging processing, and relatively low-speed imaging processing, which are imaging processing of identical content,
wherein the determination, when the imaging processing of the relatively high-speed is performed, determines that imaging processing is performed using the further evaluation value detected by the second detection, and when the relatively low-speed imaging processing is performed, determines that imaging processing is performed using one or more of the parallel evaluation values detected by the first detection.

12. The control method for the imaging apparatus according to claim 11, wherein the imaging processing includes processing for controlling a white balance or processing for controlling an exposure, and
wherein the evaluation value when the white balance is controlled includes color-difference data, and
wherein the evaluation value when the exposure is controlled includes luminance data.

13. The control method for the imaging apparatus according to claim 10, wherein the determination, before startup processing of the imaging apparatus is completed, determines that imaging processing is performed using the further evaluation value detected by the second detection, and after startup processing of the imaging apparatus is completed, determines that imaging processing is performed using one or more of the parallel evaluation values detected by the first detection.

14. The control method for the imaging apparatus according to claim 10, wherein the determination, when imaging processing is performed using an evaluation value detected from an area of a part of an imaging screen, which is an area across the plurality of areas, determines that imaging processing is performed using the further evaluation value detected by the second detection, and when imaging processing is performed using an evaluation value detected from the entire imaging screen, determines that imaging processing is performed using one or more of the parallel evaluation values detected by the first detection.

15. The control method for the imaging apparatus according to claim 14, wherein the imaging processing includes processing for executing an auto white balance function, and processing for executing a white balance setting function to adjust white balance based on data of a central part of an imaging screen of a white subject,
wherein the evaluation value includes color-difference data, and
wherein the determination, when the auto white balance function is executed, determines that imaging processing is performed using the further evaluation value detected by the second detection, and when the white balance setting function is executed, determines that imaging processing is performed using one or more of the parallel evaluation values detected by the first detection.

16. The control method for the imaging apparatus according to claim 14, wherein the imaging processing includes detection of a center-weighted averaged light metering value, and detection of an evaluative light metering value,
   wherein the evaluation value includes luminance data, and
   wherein the determination, when detection of the center-weighted averaged light metering value is performed, determines that imaging processing is performed using the further evaluation value detected by the second detection, and when detection of the evaluative light metering value is performed, determines that imaging processing is performed using one or more of the parallel evaluation values detected by the first detection.

17. A non-transitory computer readable medium encoded with instructions for controlling the apparatus according to the method of claim 9.

\* \* \* \* \*